L. McISAAC.
MINE PUMP.
APPLICATION FILED SEPT. 27, 1913.
1,112,820.
Patented Oct. 6, 1914.
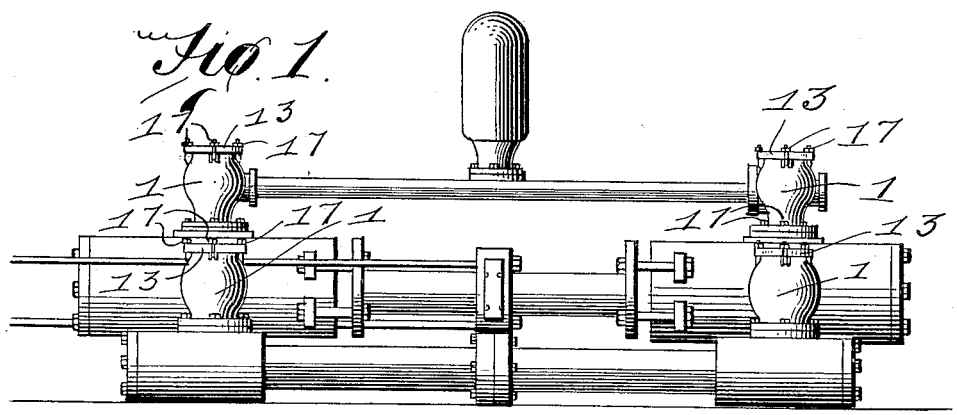
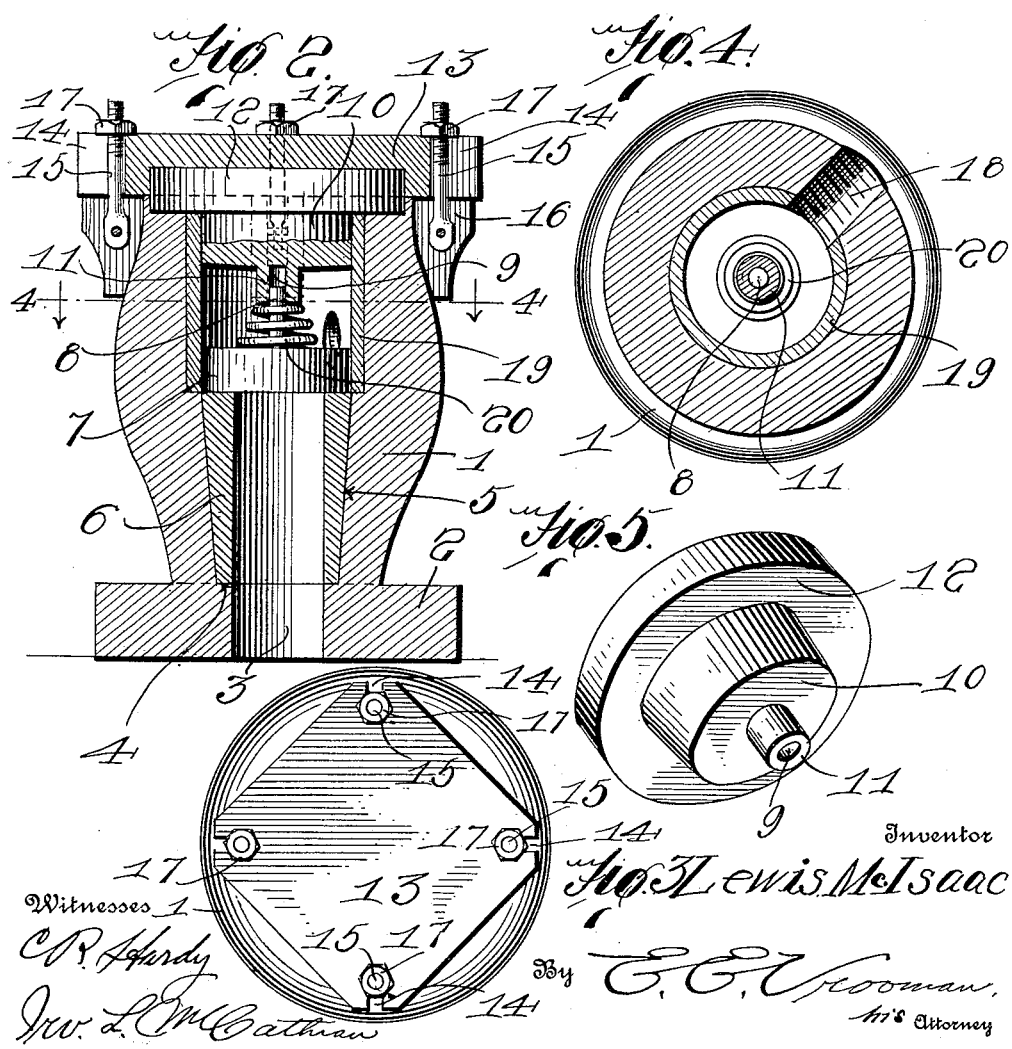
Witnesses
C. R. Hardy
Irv. L. McCathran
Inventor
Lewis McIsaac
By E. E. Vrooman,
his Attorney

UNITED STATES PATENT OFFICE.

LEWIS McISAAC, OF INVERNESS, NOVA SCOTIA, CANADA.

MINE-PUMP.

1,112,820.   Specification of Letters Patent.   Patented Oct. 6, 1914.

Application filed September 27, 1913. Serial No. 792,193.

*To all whom it may concern:*

Be it known that I, LEWIS McISAAC, a subject of the King of Great Britain, residing at Inverness, in the Province of Nova Scotia and Dominion of Canada, have invented certain new and useful Improvements in Mine-Pumps, of which the following is a specification, reference being had therein to the accompanying drawing.

This invention relates to improvements in pots of mine pumps and has reference especially to seats and covers, the inserting of seats and valves, and the wooden protection of the cover and the guide for the valves.

One of the principal objects of the invention is the production of an improvement to prevent the splitting and shearing of the wooden seats by pressure of the water.

A still further object of the invention is to facilitate the insertion of the seats and valves by avoiding unbolting and taking the same apart.

A still further object of the invention is to produce a wooden protector cover and guide for the valve for preventing leakage of mine water and the consequent corrosion thereof.

With the above and other objects in view this invention consists of certain novel combinations, constructions and arrangements of parts as will be hereinafter fully described and claimed.

In the accompanying drawings:—Figure 1 is a side elevation of the pump. Fig. 2 is a vertical section of the valve pot. Fig. 3 is a top plan view thereof. Fig. 4 is a section taken on line 4—4, of Fig. 2. Fig. 5 is a detail perspective of the valve cover used in connection with the present invention.

As is illustrated in Fig. 2 of the drawings the pot consists of a body portion 1 having a broad base 2. The pot 1 is provided with a centrally located aperture 3 which is reduced at its lower end for producing a shoulder portion 4. The side walls 5 of the pot are inclined toward the lower end thereof so as to allow a beveled lining 6 to be placed therein. This lining is formed of wood and by having the sides inclined it will be seen that the casing 6 will be firmly held in engagement with the side walls of the pot and considerable of the pressure will be relieved from the shoulder 4 since the inclined sides of the pot will take up considerable of this pressure. A valve head 7 is slidably mounted within the casing and carries a stem 8, which stem works in a socket 9 formed in the head 10. This socket 9 is formed as illustrated in Fig. 2 of the downwardly projecting neck portion 11 of the head 10. The head 10 is provided with an enlarged upper portion 12 for fitting upon the upper face of the pot 1. An iron cover 13 is placed upon the upper end of the pot 1 and fits over the enlarged portion 12 of the head 10 and is provided with a plurality of notch portions 14 upon the corners thereof for receiving the bolts 15, which bolts are pivotally mounted between the ears 16 carried by the pot 1. Nuts 17 are threaded upon the outer ends of the bolts 15 for firmly holding the cover 13 in a set position upon the pot 1. The pot 1 is provided with a discharge aperture 18 which is internally threaded for receiving a discharge pipe of any desired construction. A lining 19 is also placed upon the side walls of the pot 1, but the side walls which engage the lining 19 are not tapered as are the walls 5.

From the foregoing description it will be seen that the wooden linings as set forth do away with the necessity of employing the usual washers which have been heretofore used in connection with such devices. It should be further understood that on account of the manner in which the seat is placed within the pot the same may be used with any kind or size of pot pump which is desired. It should be further understood that the seat may be inserted by removing the cover from the top of the pot and pressing the same downwardly into the bottom portion of the receptacle.

As illustrated in Fig. 2 a spiral spring 20 is mounted upon the stem 8 and engages the lower end of the neck 11 for normally holding the valve 7 upon its seat. The wooden cover for the pot will protect the upper end from the action of the water, and should this cover wear out the same may be replaced by a new cover made of a similar construction. It should be understood that the lower flange of the pot may be bolted or otherwise secured to the pump in order that the pump may be firmly anchored in engagement with the pump.

Having thus described the invention what is claimed as new, is:—

A pot for a pump comprising a body, said body provided with a centrally located aperture having inclined walls upon the lower end thereof, a tapered lining engaging the inclined walls of said pot, a second lining positioned above said tapered lining, a spring pressed valve engaging the same, a removable cap provided with notches upon the edge thereof, flanges carried by the sides of said body, and bolts pivotally mounted between said flanges and engaging said notches for firmly holding said cover upon said body.

In testimony whereof I hereunto affix my signature in presence of two witnesses.

LEWIS McISAAC.

Witnesses:
W. A. MACDONALD,
LILLIAN BAIN.

Copies of this patent may be obtained for five cents each, by addressing the "Commissioner of Patents, Washington, D. C."